(12) United States Patent
Murata

(10) Patent No.: US 6,452,337 B1
(45) Date of Patent: Sep. 17, 2002

(54) LAMP CIRCUIT FOR AUTOMOBILES

(75) Inventor: Takashi Murata, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 18 days.

(21) Appl. No.: 09/596,197

(22) Filed: Jun. 16, 2000

(30) Foreign Application Priority Data

Jun. 22, 1999 (JP) .......................................... 11-175370

(51) Int. Cl.[7] .................................................. B60Q 1/02
(52) U.S. Cl. ........................................ 315/82; 307/10.8
(58) Field of Search .............................. 315/82, 77, 79, 315/76, 80; 307/10.6, 10.7, 10.8

(56) References Cited

U.S. PATENT DOCUMENTS

| | | |
|---|---|---|
| 3,139,555 A | 6/1964 | Paule et al. |
| 3,262,011 A | 7/1966 | Cones |
| 4,928,036 A * | 5/1990 | Abboud .................... 315/82 |
| 5,075,593 A * | 12/1991 | Shoda ..................... 315/82 |
| 5,780,974 A * | 7/1998 | Pabla et al. .............. 315/82 |
| 5,886,471 A * | 3/1999 | Benedict et al. .......... 315/82 |
| 5,912,534 A * | 6/1999 | Benedict ................. 315/82 |

FOREIGN PATENT DOCUMENTS

| | | |
|---|---|---|
| DE | 19510542 | 11/1995 |
| JP | 9290684 | 11/1997 |
| JP | 10086766 | 4/1998 |
| JP | 11078686 | 3/1999 |

OTHER PUBLICATIONS

An English Language abstract of JP 9–290684.
An English Language abstract of JP 10–086766.
An English Language abstract of JP 11–078686.
English Language Abstract of DE 19510542.

* cited by examiner

Primary Examiner—Don Wong
Assistant Examiner—Chuc D. Tran
(74) Attorney, Agent, or Firm—Greenblum & Bernstein, P.L.C.

(57) ABSTRACT

There is provided a lamp circuit for automobiles which complies with DRL illumination and reduces the number of electrically functional components and circuits. The lamp circuit for automobiles includes a DRL controller complying with DRL illumination, a lamp switch box, and a DRL relay which is also used for the head lamps. The DRL relay has two contact points, a common contact point, and two coils. This allows only one relay to be provided within the area in which two relays have conventionally been applied, thereby reducing the number of relays and necessary circuits.

12 Claims, 2 Drawing Sheets

LAMP CIRCUIT FOR AUTOMOBILES

BACKGROUND OF THE INVENTION

1. Field of the Invention

The present invention relates to a lamp circuit for automobiles, more particularly, to the achievement of reduction in the number of electrically functional parts used in the lamp circuit, thereby achieving a reduction in the amount of wiring, by simplifying the circuit while maintaining the function of lamp circuit.

2. Description of the Related Art

In automobiles to be used in northern Europe, the lamps of the automobiles are required to light up even in the daytime due to a longer time interval of dim sunlight. Therefore, automobiles intended for destination to such areas adopt a specific lamp circuit, so called "DRL" (Daytime Running Light) which lights up a low beam lamp in the headlamp when the engine operates with the ignition switch being ON.

FIG. 2 shows a lamp circuit 1 which corresponds to the conventional DRL, and the above-mentioned lamp circuit is provided with a DRL controller 2, a lamp switchbox 3, a head lamp relay 4, a DRL relay 5, right/left low beam lamps 6a and 6b in the head lamp, and right/left high beam lamps 7a and 7b, in the head lamp.

In the above-mentioned DRL controller 2, circuits are incorporated for a tail lamp ON signal from lamp switch box 3, a light up signal of head lamp, a passing signal, and a high-side switching signal are entered; and an ON signal of the ignition switch 8 and engine operation signals of the signal output component 9 can be entered.

In addition, the DRL controller 2 is programmed so that it properly closes a lamp light ON contact point 2a and High/Low switching contact point 2b, when these types of signals are received and consequently drop the above-mentioned contact points to an 0V (ground level).

DRL illumination of the above-mentioned lamp circuit 1 is carried out by running the engine with the ignition switch 8 turned ON and entering an ignition ON signal and an engine operation signal to a DRL controller. On receiving the above-mentioned signal, a circuit is set up with a coil 4b provided between a battery B and a head lamp relay 4 by closing the lamp illumination contact point 2a by the DRL controller 2, the relay contact point 4a is closed by the coil 4b being energized, while in a DRL relay 5, a low-side contact point 5a is closed because of the coil 5c has not been energized. Thus, with the closed connection of these respective contact points, the battery B causes left/right low beam lamp 6a and 6b to be illuminated.

In order to illuminate the left/right high beam lamps 7a and 7b, a head lamp switch 3a of switch box 3 is connected with a head lamp contact point 3e, and high/low switching switch 3c is connected with a high side contact point 3g, whereby the head lamp light-up signal and high-side switching signal are entered into the DRL controller 2. With this input signal, the DRL controller 2 closes the high/low switching contact point 5b by energizing the coil 5c. With these actions, the battery B and left/right high beam lamps 7a and 7b are connected, which consequently causes the above-mentioned lamps to be illuminated.

In this case, the illumination of lamps other than as mentioned above can also illuminate the tail lamps and interior night lighting (not illustrated here), and can also illuminate low beam lamps 6a and 6b as well as illumination of the above-mentioned tail lightening without connecting the high/low switching switch 3C to the high side contact point 3g. In addition, by connecting a passing switch 3b with a passing contact point 3f, the high beam lamps 7a and 7b can be illuminated in a passing mode.

The illumination described above is performed in such a manner that, other than illumination of the DRL, the illumination in this case is made possible without regard to switching ON/OFF of the ignition switch 8 in consideration of safety, etc.

In order to carry out control of the DRL, a lamp circuit 1 which complies with the above-mentioned DRL uses an additional number of electrically functional components, such as DRL relay 5 and a circuit for the relay, compared with those of normal illumination lamp circuits.

Therefore, there are the problems of additional expenses for the above-mentioned relay, circuit, etc., and the number of processes required for circuit manufacture will also increase. Furthermore, the space required for housing the circuit becomes larger, and weight also increases. In addition, an exclusive relay block for connecting the above-mentioned relay, etc., becomes necessary, which may also increase the factor of cost.

The present invention was made in view of the above-mentioned problems, with the aim of achieving cost reduction and weight reduction by decreasing the number of circuits and electrically functional components, by revising the present condition of lamp circuits for automobiles complying with DRL requirements.

SUMMARY OF THE INVENTION

In order to solve the above-mentioned problems, one aspect of the present invention provides a lamp circuit for automobiles, which complies with DRL illumination for a low beam lamp and a high beam lamp in head lamp, wherein, the lamp circuit is provided with a DRL controller, a lamp switch box, a relay, at least one low beam lamp, at least one high beam lamp, an ignition switch, an engine operation signal output component, and a battery.

The above-mentioned relay is provided with a common contact point, two contact points that are normally open, and two coils. The common contact point is connected with the battery, and one of the above-mentioned two contact points is connected with the low beam lamp, the other connected with the high beam lamp, respectively, and the two coils are connected with the DRL controller.

The DRL controller is connected in such a manner that respective signals from the lamp switch box, the ignition switch, and the engine operation signal output component are entered, so that, in a first condition, the contact point connected with the low beam lamp is closed and the DRL is illuminated, as a result of energization of one of the two coils of the above-mentioned relay, when signals from the ignition switch and the engine rotation signal output component are entered to the DRL controller.

In a second condition, the other one of the two coils of the above-mentioned relay becomes energized according to a signal when a signal from the lamp switch box is entered to the above-mentioned DRL controller, and the other of the at least one low beam lamp and the at least one high beam lamp is illuminated as a result of closing the above-mentioned relay which corresponds to the other coil.

In this way, the use of a relay having two coils at two contact points in a lamp circuit which complies with the DRL light-up has replaced the components in a circuit, which have conventionally been composed of a head lamp relay and a DRL relay, with a single relay while maintaining the same function as the conventional ones. Accordingly, this allows the number of relays, electric functional components, and circuits to be reduced. In addition, along with the reduction of components, the costs required for the circuits as well as weight and the like can also be decreased.

The above-mentioned relay having two coils allows proper switching between DRL high beam illumination and normal illumination by switching two contact points with respective coils energized by entering each type of signals. In addition, if the above-mentioned two coils are not energized, it is not possible to illuminate the low beam lamp, etc., because the circuit is shut off when the electric power source is at an OFF condition, because the two contact points have a middle neutral position at which both contact points come to an open position simultaneously.

In another aspect of the present invention, a lamp circuit which provides a DRL illumination for a vehicle is provided that includes at least one low beam lamp and at least one high beam lamp, a controller, a lamp switch box, a switching mechanism, an ignition switch, an engine rotation signal output component, and a battery.

The switching mechanism is provided with a common contact point, first and second contact points which are normally open, a movable connecting piece connected to the common contact point, and operating mechanism for moving the connecting piece from a neutral position to a selected one of the first contact point and the second contact point. The common contact point is connected with the battery, one of the first and second contact points is connected with the at least one low beam lamp, the other of the first and second contact points is connected with the at least one high beam lamp, respectively, and the operating mechanism is connected with the controller.

The controller is connected in such a manner that respective signals from the lamp switch box, the ignition switch, and the engine rotation signal output component are entered in the controller, the connecting piece is connected with the first contact point and one of the at least one low beam lamp and the at least one high beam lamp as a result of actuation of the operating mechanism of the switching mechanism, when signals from the ignition switch and the engine rotation signal output component are entered in the controller to thereby illuminate the DRL, and the operating mechanism of the switching mechanism is actuated according to the signal when a signal from the lamp switch box is entered to the controller to connect the connecting piece to the second contact point, and the other of the at least one low beam lamp and the at least one high beam lamp is illuminated.

In other aspects of the invention, the lamp circuit may include at least two low beam lamps, or at least two high beam lamps, or at least two low beam lamps and at least two high beam lamps. Furthermore, the controller may include a DRL controller, the switching mechanism may include a relay, and the relay may include first and second coils, the first coil being energizable to move the connecting piece to engage the first contact point, and the second coil being energizable to move the connecting piece to engage the second contact point.

BRIEF DESCRIPTION OF THE DRAWINGS

The present invention is further described in the detailed description which follows, with reference to the noted plurality of drawings by way of non-limiting examples of certain embodiments of the present invention, in which like numerals represent like elements throughout the several views of the drawings, and wherein.

DETAILED DESCRIPTION OF THE PREFERRED EMBODIMENTS

Figure 1:
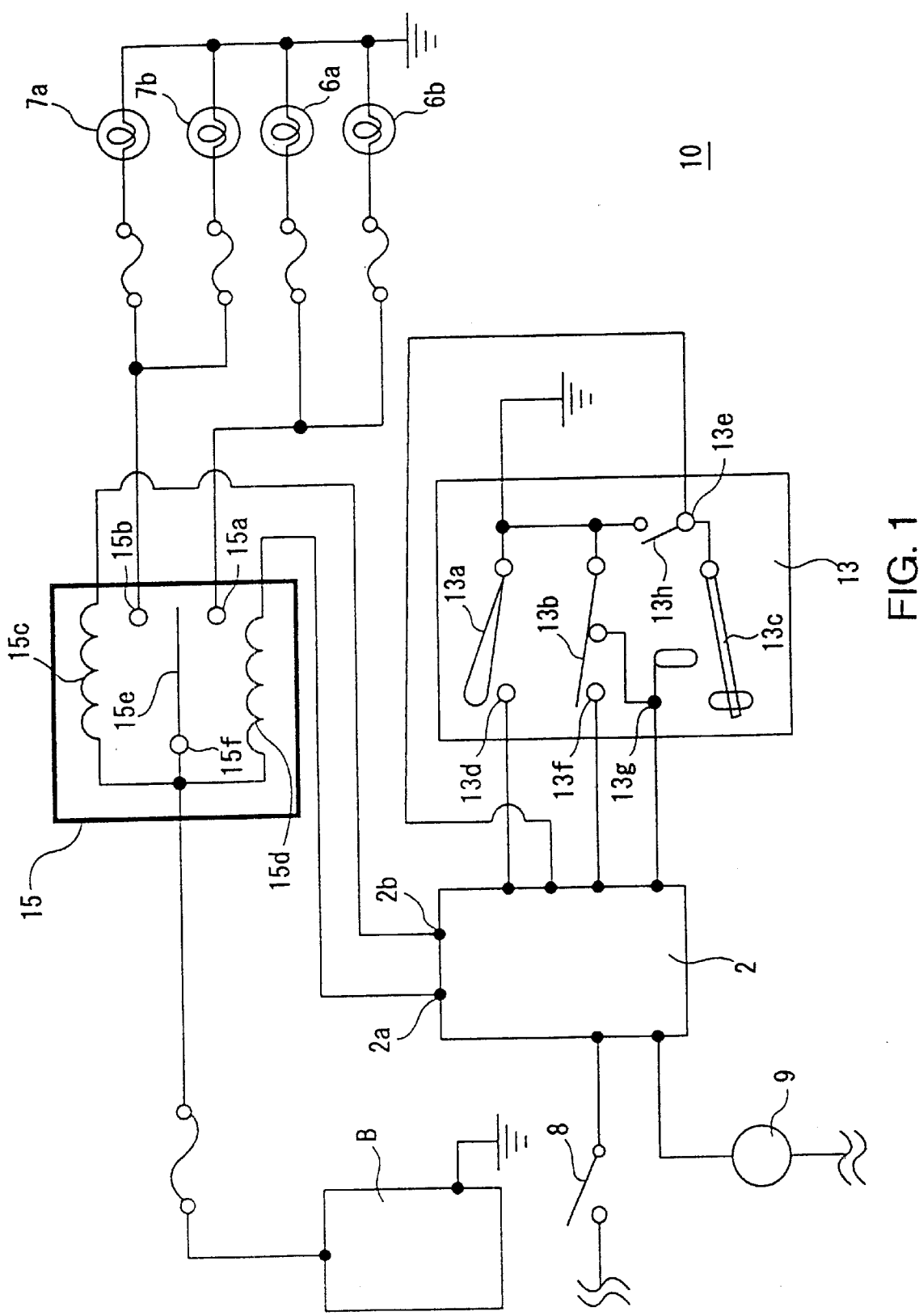
FIG. 1 depicts a drawings of lamp circuit which complies with DRL an aspect of the present inventions.
Figure 2:
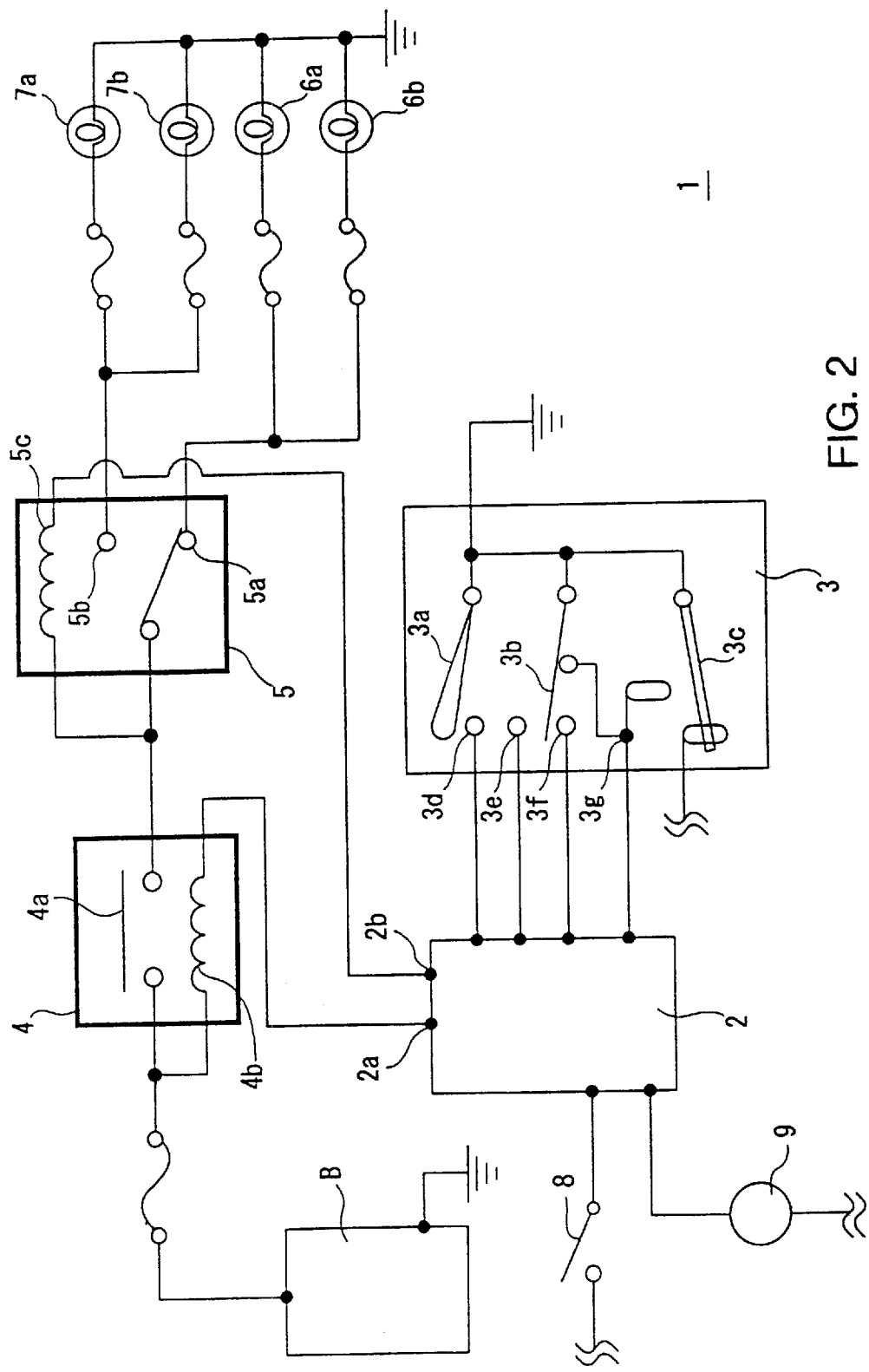
FIG. 2 depicts a drawing of a conventional lamp circuit which complies with DRL.

The description of an embodiment of the present invention follows, with reference to drawings. In this case, the same reference numerals are applied to the components and the devices which form the conventional device described above.

FIG. 1 depicts a lamp circuit 10 for automobiles which complies with DRL of the present invention, and includes a DRL relay 15 for use with a lamp switch box 13 and head lamps. The DRL relay 15 is connected with a DRL controller 2 which is similar to the conventional one, to left/right low beam lamps 6a and 6b of the head lamps, and to left/right high beam lamps 7a and 7b of the head lamps. The DRL controller 2 is provided with a lamp illumination contact point 2a and a high/low switching contact point 2b, and is also connected with the ignition switch 8 and the engine rotation signal output component 9.

The lamp switch box 13 is provided with a head lamp switch 13a, a passing switch 13b, a high/low switching switch 13c, a respective switch of head lamp interlocking switch 13h, a tail lamp contact point 13d, a head lamp contact point 13e, passing contact point 13f, and a high side contact point 13g. The head lamp switch 13a is connectable with the tail lamp contact point 13d, in the same manner as above, the passing switch 13b is connectable with the passing contact point 13f, high/low switching switch 13c is connectable with a high side contact point 13g, and the head lamp interlocking switch 13h is connectable with the head lamp contact point 13e, respectively.

In addition, the tail lamp contact point 13d, head lamp contact point 13e, passing contact point 13f, and high-side contact point 13g are connected with the DRL controller 2. Thus, when respective switches such as the above-mentioned head lamp switch 13a, etc., are connected with the respective contact points, each type of signal enters the DRL controller 2.

On the other hand, a DRL relay 15, an electrical functional component is also used for the head lamp, and includes a low side contact point 15a, a high side contact point 15b, a low side coil 15d, a high side coil 15c, a connecting piece 15e, and a common contact point 15f. The connecting piece 15 releases to a neutral position between the low side contact point 15d and the high side contact point 15b, when the low side coil 15d and the high side coil 15c are not energized, thereby commonly opening these contact points (normally OPEN). Additionally, when the low side coil 15d is energized, the connecting piece 15e is pulled toward the low side coil 15d, which connects the low side contact point 15a with the common contact point 15f. Alternatively, the connecting piece 15e closes the contact point 15f after the connecting piece 15e is connected with the high side contact point 15b, when the high side coil 15c is energized. In this case, the low side coil 15d and the high side coil 15c are configured so that both cannot be energized simultaneously, by programming the DRL controller 2.

The low side contact point 15a of DRL relay 15 is connected with the low beam lamps 6a and 6b, the high side contact point 15b is connected with the high beam lamps 7a and 7b, and the common contact point 15f is connected with the battery B, respectively. The low-side coil 15d is connected with a lamp illumination contact point 2*a* of the DRL controller 2 while the high side coil 15*c* is connected with the high/low switching contact point 2*b*.

As mentioned above, since the DRL relay 15 which is also used with the head lamps is provided with two coils and two contact points, a portion of the conventional construction including two relays (head lamp relay and DRL relay) is replaced with one having a single relay (the DRL relay 15 which is also used with the head lamps). In addition, a circuit which was previously connected between the two conventional relays is omitted.

The DRL illumination of the lamp circuit 10 is carried out by operating the engine with the ignition switch 8 turned ON, without operating respective switches of the lamp switch box 13 in the same manner as has conventionally been adopted. With the above-mentioned operation, an ON signal of the ignition switch and an engine operation signal of engine operation signal output component 9 are entered to the DRL controller 2. Upon receiving this entered signal, the DRL controller 2 energizes the low-side coil 15*d* of the DRL relay 15 which is also used for the head lamps, following the close of the illumination contact point 2*a*. With this energizing, the low side coil 15*d* is excited, which causes the connecting piece 15*e* to connect with the low side contact point 15*a*, which completes a circuit between battery B and left/right low beam lamps 6*a* and 6*b* followed by illumination of these lamps.

Furthermore, in order to illuminate the left/right high beam lamps 7*a* and 7*b*, the head lamp interlock switch 13*h* is connected with the head lamp contact point 13*e* by connecting the high/low switching switch 13*c* of the switch box with the high side contact point 13*g*, which sends a high side switching signal and a head lamp illumination signal to the DRL controller 2.

On receiving the input signal, the DRL controller 2*b* closes only the high/low switching contact point 2*b* so that the high-side coil 15*c* is excited, the connecting 15 piece 15*e* is connected with the high-side contact point 15*b*, and the circuit between the battery and left/right high-beam lamps 7*a* and 7*b* is connected, which illuminates the left/right high beam lamps.

In this case, the illumination of lamps other than the above-mentioned lamps can also be carried out in almost the same manner by connecting the head lamp switch 13*a* with the tail lamp contact point 13*d*, which consequently lights up the tail lamp and interior night lighting (not illustrated here). In addition, the low beam lamps 6*a* and 6*b* and the tail lamp lighting system can be illuminated by connecting the head lamp interlock switch 13*h* with the head lamp contact point 13*e* and without connecting the high/low switching switch 13*c* with the high-side contact point 13*g*. Furthermore, by connecting the passing switch 13*b* with the passing contact point 13*f*, the high beam lamps 7*a* and 7*b* can be illuminated in a passing mode.

The above-mentioned illumination, which is made to light up regardless of switching ON/OFF of ignition switch 8 in consideration of safety and the like, is carried out in the same manner as the conventional one except for illumination by DRL. In this case, except as noted above, because the low-side coil 15*d* and the high-side coil 15*c* of the DRL relay 15, which is also used to illuminate the head lamps, is not energized, the connecting piece 15*e* stays in the normally open position without being connected with the low-side contact point 15*a* or the high-side contact point 15*b*, thereby making it impossible for the low-beam lamps 6*a* and 6*b* and the high beam lamps 7*a* and 7*b* to be illuminated.

As is apparent from the above description, the use of a lamp circuit for automobiles which complies with DRL of the present invention enables the number of relays, electrical functional components, and circuits to be decreased, resulting in reduced costs required for the lamp circuits compared with the conventional circuits under such conditions to maintain the same level of conventional functions regarding lighting up of DRL and the like. In addition, the space necessary for housing the above-mentioned circuit, as well as the weight, can be reduced.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. HEI-11-175370, filed on Jun. 22, 1999, which is herein expressly incorporated by reference in its entirety.

What is claimed:

1. A lamp circuit for an automobile, including a lamp circuit which complies with a DRL illumination for a low beam lamp and a high beam lamp in a head lamp, said lamp circuit comprising:

a DRL controller, a lamp switch box, a relay, at least one low beam lamp, at least one high beam lamp, an ignition switch, an engine rotation signal output component, and a battery;

said relay being provided with a common contact point, two contact points which are normally open, and two coils;

said common contact point being connected with the battery, either one of said two contact points being connected with said at least one low beam lamp, the other of said two contact points being connected with said at least one high beam lamp, respectively, and said two coils being connected with said DRL controller;

said DRL controller being connected in such a manner that respective signals from said lamp switch box, said ignition switch, and said engine rotation signal output component are entered in said DRL controller;

wherein said contact point connected with one of said at least one low beam lamp and said at least one high beam lamp is closed and the DRL is illuminated as a result of energizing one of said two coils of said relay, when signals from said ignition switch and said engine rotation signal output component are entered in said DRL controller; and, the other of said two coils of said relay being energized according to the signal when a signal from said lamp switch box is entered to the DRL controller, and the other of said at least one low beam lamp and said at least one high beam lamp is illuminated as a result of closing said relay which corresponds to the other of said two coils.

2. The lamp circuit for an automobile according to claim 1, further comprising at least two said low beam lamps.

3. The lamp circuit for an automobile according to claim 1, further comprising at least two said high beam lamps.

4. The lamp circuit for an automobile according to claim 1, further comprising at least two said low beam lamps and at least two said high beam lamps.

5. A lamp circuit which provides a DRL illumination for a vehicle, said lamp circuit comprising:

at least one low beam lamp and at least one high beam lamp;

a controller, a lamp switch box, a switching mechanism, said at least one low beam lamp, said at least one high beam lamp, an ignition switch, an engine rotation signal output component, and a battery;

said switching mechanism being provided with a common contact point, first and second contact points which are normally open, a movable connecting piece connected to said common contact point, and operating mechanism for moving said connecting piece from a neutral position to a selected one of said first contact point and said second contact point;

said common contact point being connected with the battery, one of said first and second contact points being connected with said at least one low beam lamp, the other of said first and second contact points being connected with said at least one high beam lamp, respectively, and said operating mechanism being connected with said controller;

said controller being connected in such a manner that respective signals from said lamp switch box, said ignition switch, and said engine rotation signal output component are entered in said controller;

said connecting piece being connected with said first contact point and one of said at least one low beam lamp and said at least one high beam lamp as a result of actuation of said operating mechanism of said switching mechanism, when signals from said ignition switch and said engine rotation signal output component are entered in said controller to thereby illuminate the DRL; and, said operating mechanism of said switching mechanism being actuated according to the signal when a signal from said lamp switch box is entered to the controller to connect said connecting piece to said second contact point, and the other of said at least one low beam lamp and said at least one high beam lamp is illuminated.

6. The lamp circuit for an automobile according to claim 5, further comprising at least two said low beam lamps.

7. The lamp circuit for an automobile according to claim 5, further comprising at least two said high beam lamps.

8. The lamp circuit for an automobile according to claim 5, further comprising at least two said low beam lamps and at least two said high beam lamps.

9. The lamp circuit for an automobile according to claim 5, wherein said controller comprises a DRL controller.

10. The lamp circuit for an automobile according to claim 5, wherein said switching mechanism comprises a relay.

11. The lamp circuit for an automobile according to claim 10, wherein said relay comprises first and second coils, said first coil being energizable to move said connecting piece to engage said first contact point, and said second coil being energizable to move said connecting piece to engage said second contact point.

12. The lamp circuit for an automobile according to claim 5, wherein said controller comprises a DRL controller, said switching mechanism comprises a relay, and said relay comprises first and second coils, said first coil being energizable to move said connecting piece to engage said first contact point, and said second coil being energizable to move said connecting piece to engage said second contact point.

* * * * *